United States Patent [19]
Hombach et al.

[11] 4,445,959
[45] May 1, 1984

[54] PROCESS FOR THE PRODUCTION OF SYNTHETIC RUBBER LATICES, THEIR USE AS A STARTING MATERIAL IN THE PRODUCTION OF PRESSURE-SENSITIVE ADHESIVES AND PRESSURE-SENSITIVE ADHESIVES

[75] Inventors: Rudolf Hombach; Wilfried Nolte, both of Leverkusen, Fed. Rep. of Germany; Peter J. Russell, Worchester; Nigel G. Wall, Stourbridge, both of England

[73] Assignee: Bayer Aktiengesellschaft, Leverkusen, Fed. Rep. of Germany

[21] Appl. No.: 378,278

[22] Filed: May 14, 1982

Related U.S. Application Data

[63] Continuation of Ser. No. 242,448, Mar. 11, 1981, abandoned.

[30] Foreign Application Priority Data

Mar. 19, 1980 [DE] Fed. Rep. of Germany ....... 3010429

[51] Int. Cl.$^3$ .................................................. C09J 3/18
[52] U.S. Cl. ................................ 156/332; 156/331.6; 156/334; 524/750
[58] Field of Search ..................... 156/331.6, 332, 334; 524/750

[56] References Cited

U.S. PATENT DOCUMENTS

| | | | |
|---|---|---|---|
| 2,924,545 | 2/1960 | Daly | 156/334 |
| 3,985,937 | 10/1976 | Fife | 156/334 |
| 4,001,163 | 1/1977 | Matner et al. | 524/821 |
| 4,126,504 | 11/1978 | Wolinski et al. | 156/331.6 |

FOREIGN PATENT DOCUMENTS 567557 12/1958 Canada ............................... 156/334

Primary Examiner—Joseph L. Schofer
Assistant Examiner—N. Sarofim
Attorney, Agent, or Firm—Connolly and Hutz

[57] ABSTRACT

A process for the production of synthetic rubber latices by the emulsion polymerization of a monomer mixture of:
  40 to 80 parts by weight of a conjugated diene;
  0 to 45 parts by weight of an aromatic vinyl compound;
  0 to 30 parts by weight of (meth)acrylonitrile
  0 to 30 parts by weight of a (meth)acrylic acid ester containing from 1 to 12 carbon atoms in the alcohol component or other copolymerizable compounds, and
  0.5 to 5.0 parts by weight of an $\alpha, \beta$-unsaturated mopnocarboxylic or dicarboxylic acid, the sum of the monomer compounds amounting to 100 parts by weight, characterized in that from 0.5 to 2.0 parts by weight of a chain transfer agent are used per 100 parts by weight of monomer. Said latices can be used for producing pressure-sensitive adhesives.

5 Claims, No Drawings

PROCESS FOR THE PRODUCTION OF SYNTHETIC RUBBER LATICES, THEIR USE AS A STARTING MATERIAL IN THE PRODUCTION OF PRESSURE-SENSITIVE ADHESIVES AND PRESSURE-SENSITIVE ADHESIVES

CROSS REFERENCE TO RELATED APPLICATION

This application is a continuation of application Ser. No. 242,448 filed Mar. 11, 1981 and now abandoned.

This invention relates to a process for the production of synthetic rubber latices by polymerising certain monomers in aqueous emulsion in the presence of a chain transfer agent, to their use as a raw material in the production of pressure-sensitive adhesives and to pressure-sensitive adhesives containing a synthetic rubber latex.

Contact or pressure-sensitive adhesives are widely used in the production of flexible adhesive tapes, self-adhesive labels, films and self-adhesive floor coverings.

Pressure-sensitive adhesives are required to adhere under light pressure to a surface to which they are applied. These properties are required to remain intact over a wide temperature range.

Accordingly, pressure-sensitive adhesives have to show a favourable balance between adhesion and cohesion. Adhesion is the property whereby the adhesive adheres to a certain surface, whereas cohesion is the term used for the forces responsible for the cohesion of the adhesive.

Pressure-sensitive adhesives normally consist of either natural or synthetic rubber and a tackifying resin. These adhesives are applied to the substrate in the form of solutions. Petrol is generally used as the solvent. Removal of the solvent by evaporation leaves the adhesive behind on the substrate.

The disadvantage of this process is that the solvents are either lost or they have to be recovered from the waste air by expensive processes.

Accordingly, attempts have been made to apply adhesives of the type in question from the melt. In this case, it is necessary to use low-melting resin in order to obtain the low melt viscosity required for application. Unfortunately, this greatly reduces the cohesion of the adhesives.

To obviate these disadvantages, pressure-sensitive adhesives are produced from aqueous dispersions of polymers.

Copolymers of acrylic acid and methacrylic acid esters of alkanols containing from 4 to 12 carbon atoms are primarily used for this purpose. However, disadvantages of such adhesives include their poor cohesion which is reflected on the one hand in the cold flow, i.e. the tendency of the adhesive to flow off the substrate in the adjoining region, and on the other hand in the low strength of adhesion at elevated temperatures. Although cohesion may be increased by copolymerising reactive functional groups, followed by crosslinking, this always involves a loss of adhesion.

It is also known that aqueous dispersions of either natural or synthetic rubber in admixture with dispersed resins can be used for the production of pressure-sensitive adhesives. To obtain satisfactory adhesion, it is generally necessary to use an amount of resin amounting to between 50% and 100%, based on the polymer.

The resins used in practice are, in particular, polyterpene resins and collophony esters in the form of organic solutions or aqueous dispersions.

The disadvantage here is that, in the first case, organic solvents again have to be introduced whilst, in the second case, the resin have to be dispersed by expensive processes.

Also, the use of resin dispersions is characterised by inadequate coalescence of resin particles with the latex particles, necessitating a larger addition of resin.

It has now surprisingly been found that pressure-sensitive adhesives characterised by excellent adhesion and cohesion may be produced from aqueous dispersions, even at elevated temperature, without any need for tackifying resins to be added providing a rubber latex of which the polymer was produced in the presence of suitable quantities of regulators is used as the starting material for the pressure-sensitive adhesive.

Accordingly, the present invention provides a process for the production of synthetic rubber latices by the emulsion polymerisation of a monomer mixture of 40 to 80 parts by weight of a conjugated diene;

0 to 45 parts by weight of an aromatic vinyl compound;

0 to 30 parts by weight of (meth)acrylonitrile;

0 to 30 parts by weight of a (meth)acrylic acid ester containing from 1 to 12 carbon atoms in the alcohol component or other copolymerisable compounds; and 0.5 to 5.0 parts by weight of an $\alpha,\beta$-unsaturated monocarboxylic or dicarboxylic acid, the sum total of the monomer component being 100 parts by weight, characterised in that from 0.5 to 2.0 parts by weight of a chain transfer agent are added per 100 parts by weight of monomer.

The rubber latices according to the invention are produced by the emulsion polymerisation of a monomer mixture of 1 or more conjugated dienes containing from 4 to 9 carbon atoms and one or more comonomers selected from aromatic vinyl compound, (meth)acrylates containing from 1 to 12 carbon atoms in the alcohol components, preferably acrylates containing from 4 to 8 carbon atoms in the alcohol component, (meth)acrylonitrile, preferably acrylonitrile, or other copolymerisable compounds and $\alpha,\beta$-unsaturated monocarboxylic or dicarboxylic acids.

Examples of suitable conjugated dienes are 1,3-butadiene, 2-methyl-1,3-butadiene (isoprene), 2,3-dimethyl-1,3-butadiene, conjugated pentadienes or hexadienes and other substituted dienes, such as 2-chloro-1,3-butadiene, preferably butadiene. Examples of suitable aromatic vinyl compounds are styrene, substituted styrene, such as 4-methyl styrene and $\alpha$-methyl styrene, also divinyl benzene and vinyl naphthalene, preferably styrene. Examples of suitable (meth)acrylates are methyl(meth) acrylate, ethyl(meth)acrylate, n-butyl(meth)acrylate and 2-ethylhexyl acrylate. Examples of suitable unsaturated carboxylic acids are $\alpha,\beta$-unsaturated monocarboxylic acids containing from 3 to 5 carbon atoms, such as acrylic and methacrylic acid, $\alpha,\beta$-unsaturated dicarboxylic acids containing 4 or 5 carbon atoms, such as maleic, fumaric, citraconic and itaconic acid, also semiesters of the $\alpha,\beta$-unsaturated dicarboxylic acids, such as maleic acid-n-dodecyl semiester or fumaric acid-n-butyl semiester.

Other copolymerisable compounds which may be used are vinyl chloride, vinylidene chloride, vinyl alkyl ethers containing from 1 to 4 carbon atoms in the alkyl group, monoesters of glycols containing from 2 to 4 carbon atoms and (meth)acrylic acid, vinyl esters of carboxylic acids containing from 1 to 18 carbon atoms, such as vinyl acetate or vinyl stearate.

Particularly preferred monomers are 1,3-butadiene, styrene, acrylonitrile, 2-ethylhexyl acrylate, methacrylic acid, acrylic acid and itaconic acid.

It is preferred to use a monomer mixture of:
40 to 80 parts by weight of butadiene;
10 to 45 parts by weight of styrene;
5 to 30 parts by weight of an acrylic acid ester containing from 4 to 8 carbon atoms in the alcohol component; and
0.5 to 5.0 parts by weight of an $\alpha,\beta$-unsaturated monocarboxylic or dicarboxylic acid.

Chain transfer agents (regulators) are required for adjusting the properties of the copolymers.

Suitable chain transfer agents are alkyl mercaptans, preferably those having a chain length of from 4 to 20 carbon atoms, alkyl mercaptans containing further functional groups, such as 2-mercaptoethanol or thioglycolic acid, lower dialkyl dixanthogenates, for example diisopropyl xanthogene disulphide, and organic halogen compounds, such as carbon tetrabromide or bromomethyl benzene.

The quantity used depends inter alia on the effectiveness of the regulator and is in the range from 0.5 to 2.0 parts by weight per 100 parts by weight of monomer.

The aqueous rubber lactices are produced by known methods of emulsion polymerisation using emulsifiers.

To this end, anionic, cationic or non-ionic emulsifiers or dispersants or combinations thereof are used in a quantity of from 0.1 to 20% by weight (based on the monomer).

Examples of anionic emulsifiers are higher fatty acids, resinic acids, higher fatty alcohol sulphates, higher alkyl sulphonates and alkyl aryl sulphonates and their condensation products with formaldehyde, higher hydroxy alkyl sulphonates, salts of sulphosuccinic acid esters and sulphatised ethylene oxide adducts.

Examples of the less common cationic emulsifiers are salts of alkyl, aryl and alkyl aryl amines with inorganic or organic acids, salts of quaternary ammonium compounds and alkyl pyridinium salts.

Suitable non-ionic emulsifiers are, for example, the known reaction products of ethylene oxide with fatty alcohols, with fatty acids and their amides and alkyl phenols, such as isononyl phenol. Other suitable non-ionic emulsifiers are, for example, the reaction products of ethylene oxide with alkyl mercaptans and alkyl thiophenols or corresponding reaction products of etherified or esterified polyhydroxy compounds, such as sorbitan monostearate. The above-mentioned compounds are reacted with from 4 to 60 or more moles of ethylene oxide. Block copolymers of ethylene oxide and propylene oxide may also be used.

Suitable initiators are inorganic peroxo compounds, such as hydrogen peroxide, sodium, potassium or ammonium peroxodisulphate, peroxocarbonates and borate peroxy hydrates, also organic peroxo compounds, such as acyl hydroperoxides, diacyl peroxides, alkyl hydroperoxides, dialkyl peroxides and esters, such as tert.-butyl perbenzoate. The initiator is generally used in quantities of from 0.01 to 5% by weight, based on the total quantity of monomers used.

The inorganic or organic peroxo compounds mentioned as examples may also be used in known manner in combination with suitable reducing agents. Examples of suitable reducing agents are sulphur dioxide, alkali disulphites, alkali or ammonium bisulphites, thiosulphates, dithionite and formaldehyde sulphoxylte, also hydroxyl amine hydroxy chloride, hydrazine sulphate, iron(II)sulphate, tin(II)chloride, titanium(III)sulphate, hydroquinone, glucose, ascorbic acid and certain amines.

In many cases, it is advisable to carry out the polymerisation reaction in the presence of promoters. Suitable promoters are, for example, small amounts of metal salts of which the cations may exist in more than one valency stage. Examples are copper, manganese, iron, cobalt and nickel salts.

In addition to the components mentioned above, further auxiliaries and modifying agents such as salts, for example sodium sulphate, phosphates, such as tetrasodium, diphosphate or sodium triphosphate, or complexing agents, such as ethylene diamine tetra-acetic acid, as well as alkalis, such as sodium hydroxide, and pH-buffers, such as ammonia/ammonium salts, may be used for the emulsion polymerisation of the rubber latices according to the invention.

As known in the emulsion polymerisation field, the rubber latices may be produced in batches or continuously.

It is possible to work completely in batches, in which case all the monomers are emulsified in an aqueous emulsifier solution and the polymerisation reaction is initiated by the addition of an initiator and, optionally, a suitable reducing agent. More emulsifier solution may be added either continuously or at intervals during the polymerisation reaction.

However, it is usually advantageous to begin with a proportion of the monomers and to add the rest of the monomers together with aqueous emulsifier solution and, if necessary, more initiator, as the polymerisation reaction progresses.

Before the beginning of the reaction, the atmospheric oxygen present in the reactor is displaced by an inert gas, such as nitrogen. The emulsion is stirred to maintain the disperse state. The polymerisation temperature may be selected in the range from 0° C. to 120° C. and preferably in the range from 50° to 100° C., depending on the initiator used. The reaction is continued to a conversion of from 60 to 100% and preferably to a conversion of from 80 to 98%.

After the required final conversion has been reached, the reaction may be stopped by adding one of the conventional radical acceptors for example, diethyl hydroxylamine. Alternatively, the latex is simply left to cool. The rubber latex is filtered and freed from unreacted monomer by one of the usual demonomerisation processes, for example stripping with steam. In order finally to adjust the properties of the latex, the pH may be corrected by the addition of acid or alkali solution and the latex may be optionally treated with an antiager.

To produce pressure-sensitive adhesives, the polymers produced in accordance with the invention may be applied in the usual way to the surface of the substrates, for example paper and films, to be tackified in the form of 20% to 65% aqueous dispersions. The viscosity suitable for application may be adjusted by the addition of suitable thickeners.

In this connection, it is possible to use the additives normally employed for pressure-sensitive adhesives, for example resins, such as polyterpene resins, terpenephenol resins, plasticisers, such as adipic and phthalic acid esters. Fillers, such as calcium carbonate, barium sulphate, silicates and pigments may also be added.

In order to improve the resistance either to ageing or to oxidation of the adhesives, oxidation inhibitors, for example amines or substituted phenols, may also be used.

The dispersions according to the invention may also be used in admixture with other polymer dispersions. Suitable polymers are, for example, polymers of chloroprene, acrylate, acrylonitrile or natural rubber.

The adhesive may be applied to any suitable substrates, for example paper, films of polyethylene, PVC, polystyrene, polyester, metal foils, sheets of foam rubber, polyurethane, PVC, polystyrene, woven textiles and non-wovens of natural and synthetic fibres.

It is possible to produce articles with a coating of adhesive on both sides of the substrate. The pressure-sensitive adhesive is normally applied to the substrate using a doctor knife.

It has also been found that the dispersions according to the invention enter into a firm bond with numerous materials, for example, wood, paper, plastics such as PVC, phenol-formaldehyde resins, ceramic plates, silicates, for example, glass, metals.

Accordingly, the synthetic rubber latices produced in accordance with the invention may be used as a starting material in the production of pressure-sensitive adhesives for use on self-adhesive articles, for example, adhesive tapes, self-adhesive labels, self-adhesive films, self-adhesive floor coverings and plasters etc. So far as this particular application is concerned, it is important to note that no tackifying resins have to be added to the pressure-sensitive adhesives.

The production of rubber latices according to the invention is illustrated by the following Examples.

EXAMPLE 1

200.0 g of water, 0.4 g of sodium triphosphate, 1.0 g of potassium peroxodisulphate, 0.4 g of naphthalene sulphonic acid/formaldehyde condensate, 0.4 g of ethylene diamine tetra-acetic acid, disodium salt, and 3.6 g of dicyclohexyl sulphosuccinate were introduced into a 1.5 liter sodawater bottle (crown cork). A mixture of 90.0 g of styrene, 4.0 g of acrylic acid and 2.0 of tert-dodecyl mercaptan was then added. At the same time, the atmospheric oxygen present in the bottl was displaced by the addition of 106 g of butadiene. The bottle was then closed with a crown cork and introduced into a protective sleeve. The bottle was shaken upside down (60 r.p.m.) for 24 hours at 72° C. in a water bath, after which the bottle was cooled and opened. 96% of the monomer mixture has reacted. The latex obtained was freed from the unreacted monomer and adjusted to pH 8 with dilute sodium hydroxide solution. An antiager was then added to it. The latex was tested as follows:

The adhesive compositions were applied with a doctor knife to a 50μ thick polyethylene glycol terephthalate film. The quantity of solids applied amounted to approximately 100 g. After the adhesive compositions had been applied, the coated films were stored free from dust pending the test to evaporated the solvent.

1. Determination of tackiness

Tackiness was manually determined by touching the adhesive coating with a finger and expressed on a scale of 1 (very tacky) to 5 (inadequate tackiness).

2. Determination of bond strength

To determine the bond strength of the adhesive compositions, 30 cm long and 1.5 cm wide strips were cut from the coated films and, in accordance with AFERA Test No. 4001 P 7 (AFERA=Association des Fabricants Europeens de Rubans Auto-ADHESIFS), were applied free from bubbles to a highly polished fine steel plate and pressed down by means of an aluminium roller weighing 3 kg (two passes).

After storage for 30 minutes, the adhesive tapes were pulled off the fine steel plate at a speed of 300 mm/minute and at an angle of 180°. The forces required are shown in the following Table.

3. Determination of thermal stability under load

To determine thermal stability under load, 1 cm wide strips were affixed over a length of 6 cm to a fine steel plate of the type used in the bond strength test described above. The free end of the adhesive tape was bent through the shearing angle of 180° and subjected to a load of 0.05 kp.

The time for which the bonds withstand the indicated load of 0.05 kp at a test temperature of 50° C. was determined. The test was terminated after 180 minutes. The results obtained are shown in the following Table.

The results are shown in Table 1 together with other Examples in which polymerisation was carried out in the same way as described in Example 1.

EXAMPLES 2 to 13

Polymer latices of different composition are prepared in the same way as in Example 1, but with different quantities of regulators. The further details are shown in Tables 1 to 3.

TABLE 1

| Example No. | 1 | 2 | 3 | 4 | 5 |
|---|---|---|---|---|---|
| Monomers (parts by weight) | | | | | |
| butadiene | 53.0 | 63.0 | 63.0 | 78.0 | 53.0 |
| styrene | 45.0 | 20.0 | 21.0 | — | 20.0 |
| acrylonitrile | — | — | — | 20.0 | 10.0 |
| EHA | — | 15.0 | 15.0 | — | 15.0 |
| acrylic acid | 2.0 | 2.0 | — | 2.0 | 2.0 |
| itaconic acid | — | — | 1.0 | — | — |
| Regulator (parts by weight) | | | | | |
| tert.-dodecyl mercaptan | 1.0 | 1.25 | 1.0 | 1.0 | 1.0 |
| tackiness | 3–4 | 1–2 | 1–2 | 1 | 2–3 |
| Afera-test after 24 hours [P] | 700 | 600 | 800 | 700 | 700 |
| after 1 month [P] | 600 | 760 | 750 | 680 | 480 |
| thermal stability under load [mins.] | 180 | 180 | 180 | 70 | 60 |

EHA = 2-ethylhexyl acrylate
tackiness: 1 = very good
2 = good
3 = moderate
4 = still adequate
5 = inadequate

TABLE 2

| Example No. | 6 | 7 | 8 | 9 | 10 |
|---|---|---|---|---|---|
| Monomers (parts by weight) | | | | | |
| butadiene | 53.0 | 53.0 | 53.0 | 53.0 | 53.0 |
| styrene | 45.0 | 45.0 | 45.0 | 45.0 | 45.0 |
| acrylic acid | 2.0 | 2.0 | 2.0 | 2.0 | 2.0 |
| Regulator (parts by weight) | | | | | |
| tert.-dodecyl mercaptan | 0.5 | 0.75 | 1.25 | 1.5 | 1.75 |
| tackiness | 3 | 2–3 | 2–3 | 1 | 1 |
| Afera-test | | | | | |
| after 24 hours [P] | 220 | 750 | 820 | 1400 | 1100 |
| after 1 month [P] | 250 | 320 | 700 | 1360 | 1000 |
| termal stability under | 129 | 105 | 170 | 61 | 13 |

TABLE 2-continued

| Example No. | 6 | 7 | 8 | 9 | 10 |
|---|---|---|---|---|---|
| load [mins.] | | | | | |

TABLE 3

| Example No. | 11 | 12 | 13 | Comparison | Comparison |
|---|---|---|---|---|---|
| Monomers (parts by weight) | | | | Acronal 81 D[1] | Tesafilm[2] |
| butadiene | 63.0 | 63.0 | 63.0 | | |
| styrene | 20.0 | 20.0 | 20.0 | | |
| EHA | 15.0 | 15.0 | 15.0 | | |
| acrylic acid | 2.0 | 2.0 | 2.0 | | |
| Regulators (parts by weight) | | | | | |
| tert.-dodecyl mercaptan | 0.75 | — | — | | |
| diisopropyl xanthogene disulphide | — | 1.0 | 2.0 | | |
| tackiness | 2-3 | 2 | 1 | 1-2 | 1-2 |
| Afera-test | | | | | |
| after 24 hours [P] | 440 | 550 | 280 | 370 | 360 |
| after 1 month [P] | 320 | 380 | 200 | 400 | 300 |
| thermal stability under load | 30 | 55 | 12 | 0 | 180 |

[1] An acrylate dispersion based on 2-ethyl hexyl acrylate, Manufacturer: BASF, Ludwigshafen
[2] Natural rubber with tackifying resin Manufacutrer: Beiersdorf AG, Hamburg

We claim:

1. In the process of bonding a surface of one substrate to a surface of another substrate by applying a pressure-sensitive adhesive to at least one of said surfaces and then bringing said surfaces together in contact with each other under pressure, the improvement wherein said adhesive comprises a latex produced by emulsion polymerization of a monomer mixture containing
   40 to 80 parts by weight of conjugated diene;
   0 to 45 parts by weight of an aromatic vinyl compound;
   0 to 30 parts by weight of (meth)acrylonitrile;
   5 to 30 parts by weight of an acrylic acid ester containing from 4 to 8 carbon atoms in the alcohol component and
   0.5 to 5.0 parts by weight of an $\alpha,\beta$-unsaturated monocarboxylic or dicarboxylic acid,
the sum of the monomer components amounting to 100 parts by weight and from 0.5 to 2.0 parts by weight of a chain transfer agent being used per 100 parts by weight of monomer.

2. The process of claim 1 wherein a monomer mixture containing
   40 to 80 parts by weight of butadiene,
   10 to 45 parts by weight of styrene,
   5 to 30 parts by weight of an acrylic acid ester containing from 4 to 8 carbon atoms in the alcohol component and
   0.5 to 5.0 parts by weight of an $\alpha,\beta$-unsaturated monocarboxylic acid
is used.

3. The process of claim 1 or 2 wherein a mercapto compound, a dialkyl xanthogen disulphide, an organic halogen compound or a mixture thereof is used as the chain transfer agent.

4. The process of claim 1 or 2 wherein a mercapto compound is used as the chain transfer agent.

5. The process of claim 1 wherein an alkyl mertaptan containing from 4 to 20 carbon atoms is used as the chain transfer agent.

* * * * *